United States Patent
Kubo et al.

(10) Patent No.: US 6,469,302 B1
(45) Date of Patent: Oct. 22, 2002

(54) HEAT ABSORBENT FOR AN INFRARED SENSOR AND METHOD FOR FORMING SAME

(75) Inventors: Ryuichi Kubo, Shiga-ken; Yukio Yoshino, Otsu, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/716,727

(22) Filed: Nov. 20, 2000

(30) Foreign Application Priority Data

Nov. 19, 1999 (JP) .......................................... 11-330128

(51) Int. Cl.⁷ .............................................. H01L 31/02
(52) U.S. Cl. ................. 250/338.1; 250/336.1; 250/332
(58) Field of Search .................... 250/338.1, 336.1, 250/332

(56) References Cited

U.S. PATENT DOCUMENTS 4,575,631 A    3/1986   Satchell

FOREIGN PATENT DOCUMENTS

| JP | 3189526      | 8/1991  |             |
|----|--------------|---------|-------------|
| JP | 3-117739     | 12/1991 |             |
| JP | 4-59427      | 5/1992  |             |
| JP | 4360588      | 12/1992 |             |
| JP | 6-137942 A * | 5/1994  | ... 250/338.1 |
| JP | 10062239     | 3/1998  |             |
| JP | 20002005950  | 7/2000  |             |

* cited by examiner

Primary Examiner—Constantine Hannaher
Assistant Examiner—Andrew Israel
(74) Attorney, Agent, or Firm—Ostrolenk, Faber, Gerb & Soffen, LLP

(57) ABSTRACT

The heat conductance of the heat transfer route through which heat flows into a heat sink from the central region and its neighborhood of an absorbent via the edge region of the absorbent is made to be smaller, by making the absorbent have such a form that the film thickness of the edge region of the pattern of the infrared absorbent formed on the surface of a temperature sensing part is smaller than that of the central region of the pattern. Efficient temperature rise of a temperature sensing part is realized.

6 Claims, 2 Drawing Sheets

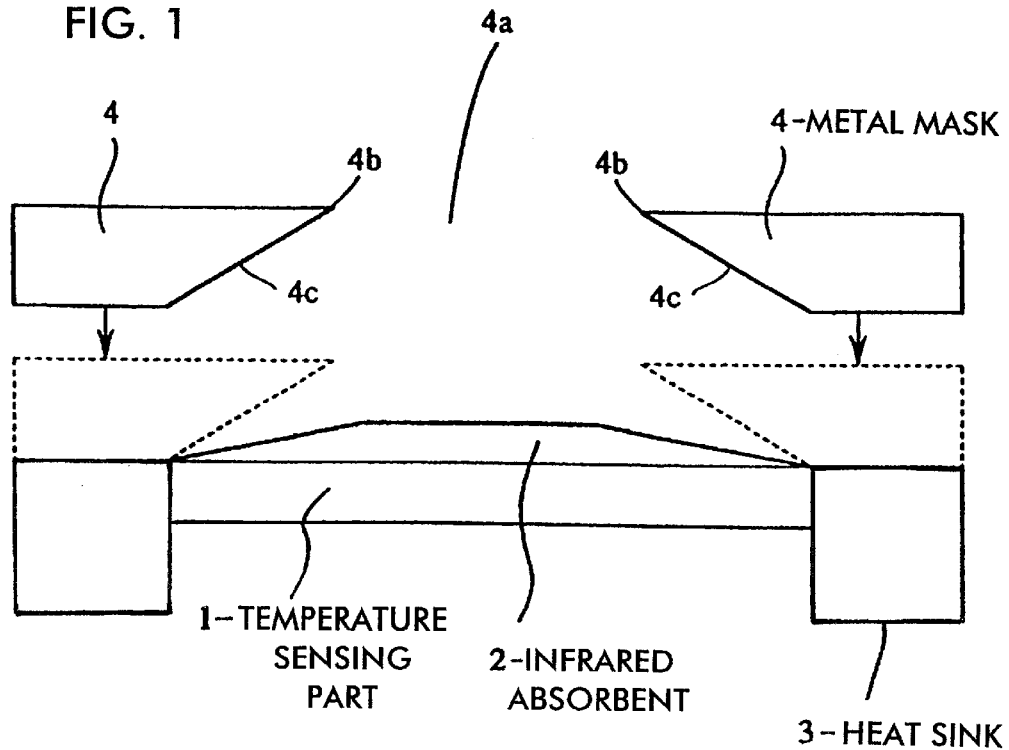
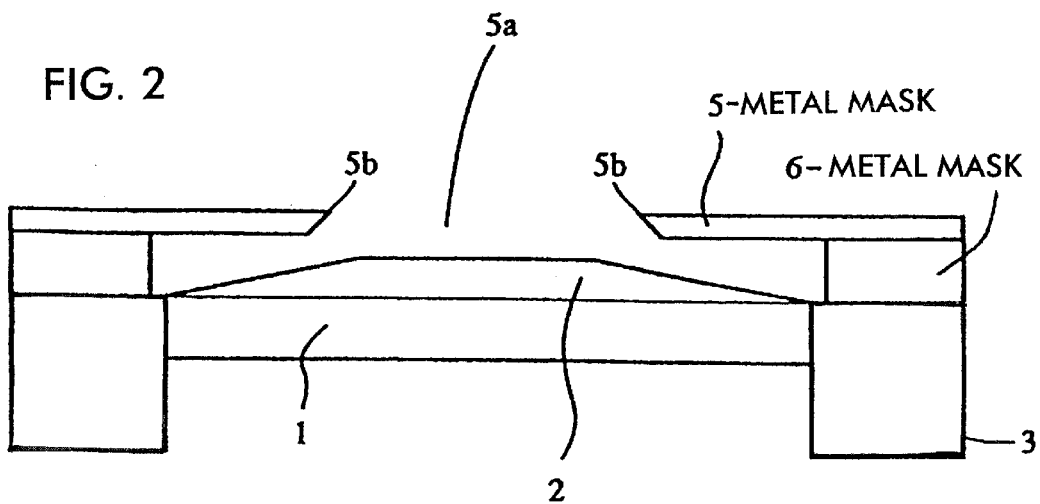

HEAT ABSORBENT FOR AN INFRARED SENSOR AND METHOD FOR FORMING SAME

BACKGROUND OF THE INVENTION

1. Field of the Invention

The present invention relates to an infrared absorbent for use in a thermal type infrared sensor, wherein the temperature of the temperature sensing part having a thermally insulated structure rises by the incidence of an infrared ray, and relates to a method for forming the absorbent.

2. Description of the Related Art

Among the infrared sensors, those classified as thermal type have a mechanism that the temperature of the temperature sensing part comprising a thermally insulated structure rises by the incidence of an infrared ray, and the temperature rise is converted into an electric signal by utilizing the pyroelectric effect, the thermoelectric effect, or the temperature coefficient of a resistor. With such a thermal type infrared sensor, it is necessary for realizing an increased sensor sensitivity to increase the temperature rise of the temperature sensing part by effectively absorbing the incident infrared ray, converting it into heat, and transferring it to the temperature sensing part. For this purpose, an infrared absorbent is placed over the temperature sensing part, where the incident infrared ray is converted into heat. Generally, a vapor deposition film of a metal such as Au black or NiCr, or a printed film of a material such as a polymer with a high infrared absorption coefficient is used as this absorbent. Regarding the patterning of this infrared absorbent, the metal mask method, the lift-off method or the like is used. For example, infrared absorbents (blackbodies) described in Japanese Unexamined Utility Model Application Publication No. 3-117739 and Japanese Unexamined Utility Model Application Publication No. 4-59427 were obtained by patterning according to such a method.

However, when deposition/patterning of an infrared absorbent is performed according to the above-described method, an absorbent pattern with a uniform film thickness results, and the following undesirable problem occurs: when an infrared absorbent formed with a metal having a good thermal conduction such as Au has a uniform film thickness, the heat transfer route through which heat flows into an external part (heat sink) from the central region and its neighborhood of the absorbent pattern via the edge region of the absorbent pattern has a large heat conductance, resulting in a large heat loss in this portion so that the temperature rise of the temperature sensing part becomes small. FIG. 3 shows the heat transfer route in this case. In this figure, the numerals 1, 2, and 3 represent a temperature sensing part, an infrared absorbent (blackbody), and a heat sink, respectively. Heat diffuses along route A from the central region and its neighborhood of the infrared absorbent 2. However, regarding the route A, the route passing through the infrared absorbent 2 has a good thermal conduction, with a result that the heat conductance of this portion becomes large, restricting temperature rise of the temperature sensing part 1.

SUMMARY OF THE INVENTION

Accordingly, it is an object of the present invention to reduce the heat loss in order to realize an efficient temperature rise of the temperature sensing part, by devising the form of a deposited infrared absorbent film.

According to an infrared absorbent of the present invention, the film thickness of the edge region of the infrared absorbent pattern formed on the surface of a temperature sensing part is smaller than that of the central region of the pattern. With this form of the infrared absorbent, the heat conductance of the heat transfer path through which heat flows into a heat sink from the central region and its neighborhood of the absorbent via the edge region of the absorbent becomes smaller, thus making it possible to have a temperature sensing part with a larger temperature rise by virtue of a smaller heat loss from the temperature sensing part. The film thickness in this case is preferably varied by forming an inclination from the central region and its neighborhood of the pattern toward the edge region of the pattern. However, the film may decrease its level step by step, or it may have some steps. It is noted that the central region of the pattern refers to a region including at least the center of the pattern, and may be limited to the center, or may include its peripheral portion.

With this configuration of the infrared absorbent, a heat loss from the edge region of the infrared absorbent is reduced, and it follows that it is possible to increase the area of the infrared absorbent. Subsequently, a further temperature rise of the temperature sensing part can be achieved as a result of the increased amount of the incident infrared ray in proportion to the increased area.

Mask vapor deposition method can be applied for the deposition of the above-described infrared absorbent. A metal mask is usually used for the mask. The mask is formed so that the part of the mask facing the central region and its peripheral region of an infrared absorbent pattern to be formed on the surface of a temperature sensing part has an opening, and the mask has a form having a slope inclined from the edge of the opening toward the edge region of the pattern. This mask is placed over the temperature sensing part for depositing an infrared absorbent on the temperature sensing part by vapor deposition or sputtering.

Another type of mask is formed so that the part of the mask facing the central region and its peripheral region of an infrared absorbent pattern to be formed on the surface of a temperature sensing part has an opening, the mask has a substantially plate shape extending from the edge of the opening toward the edge region of the pattern, and the mask is arranged over and spaced from the temperature sensing part. Thus, an infrared absorbent is deposited on the temperature sensing part by vapor deposition or sputtering. According to the deposition method described first, the absorbent is deposited along the slope of the metal mask, with a result that the film thickness of the completed absorbent is inclined from the central region and its neighborhood of the pattern toward the edge region of the pattern. According to the latter method, deposition occurs also at the edge region of the pattern by the wraparound effect at the time of deposition. As a result, an absorbent is formed, the absorbent having a form wherein the film thickness of the edge region of the pattern is smaller than that of the central region of the pattern.

According to the present invention, by making the edge of an infrared absorbent pattern thinner, the heat conductance of the heat transfer route through which heat flows into the exterior part from the central region and its neighborhood of the absorbent via the edge region of the absorbent becomes smaller, thus making it possible to have a temperature sensing part with a larger temperature rise by virtue of a smaller heat loss from the temperature sensing part. Also since the heat loss from the edge region of the above-described absorbent becomes smaller, it is possible to increase the area of the absorbent. Therefore, further temperature rise of the temperature sensing part can be achieved by the increased amount of the incident infrared ray in proportion to the increased area.

BRIEF DESCRIPTION OF THE DRAWINGS

FIG. 1 is a view showing the first embodiment of a heat absorbent for an infrared sensor according to the present invention and a method for forming the absorbent;

FIG. 2 is a view showing the second embodiment and a method for forming the absorbent.

DESCRIPTION OF THE PREFERRED EMBODIMENTS

Figure 3:
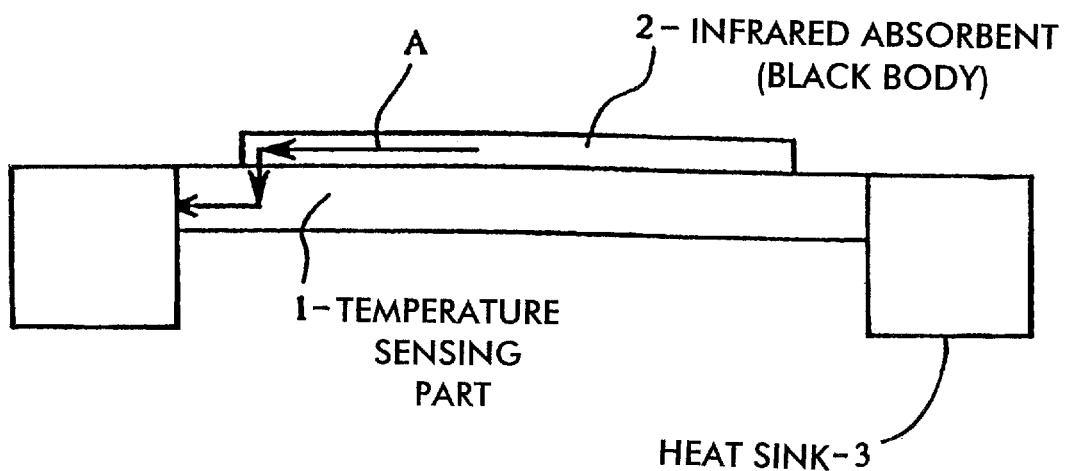
FIG. 3 is a view showing a defect of the conventional heat absorbent for an infrared sensor.

FIG. 1 shows the first embodiment of an infrared absorbent (simply referred to as "absorbent", hereinafter) which is a heat absorbent for an infrared sensor according to the present invention. A temperature sensing part 1, an absorbent 2, and a heat sink 3 are made of the same materials as those used conventionally as described in FIG. 3, respectively. For example, a thin film thermistor or the like is used for the temperature sensing part 1, when the thermal coefficient of a resistor is utilized. When the pyroelectric effect is utilized, a ferro-electric material of lithium tantalate ($LiTaO_3$) type, lead titanate ($PbTiO_3$) type, glycine sulfate (TGS) type, PZT ceramics, polyvinylidene fluoride ($PVF_2$) type or the like, is used. A metallic deposition film of Au black, NiCr or the like is used for the absorbent 2. A metal mask 4 for use in deposition has a form shown in the figure. Thus, the part of the mask facing the central region and its peripheral region of the pattern of the absorbent 2 has an opening 4a, and the mask has a slope 4c inclined from the edge 4b of the opening toward the edge region of the pattern. The opening 4a is circular when seen from above.

Low vacuum vapor deposition (several Pa) or sputtering is performed with the metal mask 4 having the above-described shape arranged over the temperature sensing part 1 and the heat sink 3. Then, a space is formed below the slope 4c, whereby the wraparound effect occurs in this region at the time of vapor deposition. As a result, the absorbent 2 is deposited in which the film thickness of the edge region of the pattern is smaller than that of the central region of the pattern. Also, the absorbent 2 has a film thickness inclined from the central region and its peripheral portion of the pattern toward the edge region of the pattern by virtue of the slope 4c.

The absorbent 2 formed in this way has a heat transfer path with a smaller heat conductance through which heat flows into the heat sink 3 from the central region and its peripheral portion of the absorbent 2 via the edge region of the absorbent 2. As a result, it is possible to make the temperature rise of the temperature sensing part 1 greater owing to a reduced heat loss from the temperature sensing part 1. Furthermore, since the heat loss from the edge region of the absorbent 2 is reduced, it is possible to increase the area of the absorbent 2. Therefore, further temperature rise of the temperature sensing part 1 can be obtained by increasing the area of the absorbent, whereby the amount of the incident infrared ray will be increased in proportion to the increased area.

FIG. 2 shows another embodiment of the present invention. This embodiment has a metal mask 5, wherein the part of the mask facing the central region and its peripheral region of the pattern of the absorbent 2 has an opening 5a, the mask has a substantially plate shape extending from the edge 5b of the opening toward the edge region of the pattern, and the mask is arranged over and spaced from the temperature sensing part 1. To make the metal mask 5 spaced apart, another metal mask 6 which has an opening area larger than that of the entire pattern of the absorbent 2 is place on the heat sink 3, on which the above-described metal mask 5 is placed. By performing low vacuum vapor deposition or sputtering using the two metal masks 5 and 6 in this way, an absorbent pattern can be formed wherein the film thickness of the edge region is smaller by virtue of the wraparound effect at the time of deposition, similarly to the example shown in the above-described FIG. 1.

In the above-described embodiments, a slope is formed from the central region and its neighborhood of the pattern of the absorbent 2 toward the edge region. However, this portion may also be formed by deposition in such a way that it decreases its level step by step, or it has some steps.

What is claimed is:

1. A heat absorbent for an infrared sensor, wherein the film thickness of the edge region of an infrared absorbent pattern formed on the surface of a temperature sensing part is smaller than that of the central region of the pattern.

2. A heat absorbent for an infrared sensor according to claim 1, wherein said film thickness is inclined from the central region and its neighborhood of the pattern toward the edge region of the pattern.

3. A method for forming a heat absorbent for an infrared sensor, wherein a mask is placed over a temperature sensing part, the part of the mask facing the central region and its peripheral region of an infrared absorbent pattern to be formed on the surface of the temperature sensing part has an opening, the mask has a form having a slope inclined from the edge of the opening toward the edge region of the pattern, and an infrared absorbent is deposited on the temperature sensing part by vapor deposition or by sputtering.

4. A method for forming a heat absorbent for an infrared sensor, wherein a mask is placed afloat over a temperature sensing part, the part of the mask facing the central region and its peripheral region of an infrared absorbent pattern to be formed on the surface of the temperature sensing part has an opening, the mask has a substantially plate shape extending from the edge of the opening toward the edge region of the pattern, and an infrared absorbent is deposited on the temperature sensing part by vapor deposition or by sputtering.

5. An infrared sensor comprising the heat absorbent for the infrared sensor according to claim 1 or claim 2, and a temperature sensing part located thereunder.

6. A method for forming an infrared sensor comprising the steps of: forming a heat absorbent according to the method of claim 3 or claim 4; and disposing a temperature sensing part under said heat absorbent.

* * * * *